United States Patent
Roychoudhury et al.

(10) Patent No.: US 7,141,092 B1
(45) Date of Patent: Nov. 28, 2006

(54) REGENERABLE ADSORPTION SYSTEM

(76) Inventors: Subir Roychoudhury, 101 Winding Rd., Madison, CT (US) 06443; Jay Perry, 125 Southwood Dr., Madison, AL (US) 35758; Dennis Walsh, 36 Redwood Dr., Richboro, PA (US) 18954

( * ) Notice: Subject to any disclaimer, the term of this patent is extended or adjusted under 35 U.S.C. 154(b) by 46 days.

(21) Appl. No.: 11/126,012

(22) Filed: May 10, 2005

Related U.S. Application Data

(60) Provisional application No. 60/569,714, filed on May 10, 2004.

(51) Int. Cl.
*B01D 53/04* (2006.01)
(52) U.S. Cl. ............................................. 95/90; 95/148
(58) Field of Classification Search .................... 95/90, 95/114, 139, 148; 96/143, 146, 153, 154; 422/174
See application file for complete search history.

(56) References Cited

U.S. PATENT DOCUMENTS

| | | | | |
|---|---|---|---|---|
| 5,308,457 A | * | 5/1994 | Dalla Betta et al. | 95/143 |
| 5,501,007 A | * | 3/1996 | Kuma | 29/846 |
| 5,505,825 A | * | 4/1996 | Gold et al. | 95/126 |
| 5,750,026 A | * | 5/1998 | Gadkaree et al. | 210/502.1 |
| 5,827,355 A | * | 10/1998 | Wilson et al. | 95/114 |
| 6,197,097 B1 | * | 3/2001 | Ertl et al. | 96/143 |
| 6,328,936 B1 | | 12/2001 | Roychoudhury et al. | 422/174 |
| 6,395,070 B1 | | 5/2002 | Bhadha et al. | 95/117 |
| 6,398,853 B1 | | 6/2002 | Keefer et al. | 96/125 |
| 6,712,878 B1 | | 3/2004 | Chang et al. | 95/90 |
| 6,905,534 B1 | * | 6/2005 | Chang et al. | 96/55 |
| 2001/0015131 A1 | * | 8/2001 | Angermann et al. | 95/90 |

* cited by examiner

Primary Examiner—Frank M. Lawrence
(74) Attorney, Agent, or Firm—Robert L. Rispoli

(57) ABSTRACT

A method for regenerable adsorption includes providing a substrate that defines at least one layer of ultra short channel length mesh capable of conducting an electrical current therethrough, coating at least a portion of the substrate with a desired sorbent for trace contaminant control or $CO_2$ sorption, resistively heating the substrate, and passing a flowstream through the substrate and in contact with the sorbent.

19 Claims, 7 Drawing Sheets o Uses existing dual train drier/CO₂ removal system
o Dry air stream from existing desiccators facilitates zeolite removal of contaminants
o NH₃ and VOC removal load may be reduced due to upstream CHX and desiccators
o Regeneration advantages may exist even if CO₂ capacity is less than the fixed bed.

REGENERABLE ADSORPTION SYSTEM

CROSS-REFERENCE

This application claims the benefit of U.S. Provisional Application No. 60/569,714 filed May 10, 2004.

GOVERNMENT RIGHTS

This invention was made with government support under NASA Contract No. NAS8-02108. The U.S. government holds certain rights in this invention.

FIELD OF THE INVENTION

The present invention is generally directed to a method and apparatus for removing trace contaminants from a flowstream. In particular, this invention provides an improved adsorption process for spacecraft cabin air quality control. More particularly, this invention provides for an energy efficient, lightweight sorption system for the removal of environmental contaminants in space flight applications.

BACKGROUND OF THE INVENTION

Adsorption methods for removing trace contaminants from a flowstream typically comprise passing the flowstream over or through a sorbent structure. The sorbent structure may be defined by a plurality of pellets or an array of tubes or plates or the like, and such structure typically is positioned within the flowpath of the flowstream to be treated. The sorbent structure may comprise, or be coated with, sorbent particles that adsorb targeted impurities from the flowstream. Although such systems are well known in the art, several problems or shortcomings associated with conventional adsorption methods correspondingly also are well known in the art.

For example, when the sorbent becomes saturated, the sorbent must be regenerated or removed and replaced. Typically, the entire sorbent structure simply is replaced. Preferably, the sorbent structure is regenerable. In some systems, the sorbent structure is removed from the adsorption stream, subjected to a desorption process, and then re-exposed to the adsorption stream. One alternative method is described in U.S. Pat. No. 6,712,878 to Chang, et al., wherein sorbent particles are injected into the flowstream and then the flowstream is passed into contact with the sorbent structures. The saturated sorbent periodically is removed and fresh sorbent again is injected into the flowstream.

Another problem associated with conventional adsorption methods is the efficiency of the adsorption technique employed. Often, the unique characteristics of the targeted impurities and the sorbent itself dictate that the adsorption process operate within a desired temperature range. Several methods are known for raising the temperature of the process including heating the flowstream or the sorbent structure by employing an auxiliary heat source. However, non-uniform heat distribution within a fixed-bed substrate or other sorbent structure negatively impacts the efficiency of the process. In addition, the time it takes for an auxiliary heat source to raise the temperature of the sorbent structure, and thereby raise the temperature of the sorbent and the working fluid, further negatively impacts the efficiency of the process. Moreover, less-complex auxiliary heat sources may not provide the capability to reach and hold a narrow operating temperature range as may be required for the subject adsorption goal. Although more complex auxiliary heating systems may be capable of achieving and holding a narrow operating temperature range in a comparatively short time interval, such devices add considerable weight and cost to the adsorption process.

In addition to conventional applications for adsorption processes, such processes occupy an important niche in spacecraft environmental control and life support systems. Primary applications for adsorption processes exist in the area of cabin air quality control. Since the beginning of crewed space exploration, adsorption processes have been at the forefront for ensuring that cabin air is suitable for the crew to breathe by removing trace chemical contaminants and $CO_2$. The ability to remove trace contaminants (e.g. alcohols, ketones, aromatics, halocarbons, and ammonia) from cabin air is a necessary aspect of spacecraft life support systems such as that employed on the International Space Station ("ISS"). Currently, this trace contaminant control system ("TCCS") requirement is met on the ISS by employing a 50 lb. bed of acid-treated activated carbon, which is not regenerated. Due to its long life (>2 yrs.), the carbon bed is simply replaced periodically. The current $CO_2$ removal system on the ISS employs two pellet bed canisters of 5A molecular sieve that alternate between regeneration and sorption via heating and exposure to space vacuum.

It is anticipated that adsorption processes will continue to remain at the forefront of spacecraft cabin air quality control technologies. As mission durations increase and exploration goals reach beyond Earth orbit, the need for regenerable adsorption processes becomes paramount. Thus, there is a need in the art for an adsorption process that is capable of regenerably removing trace contaminants from a flowstream in an efficient, cost-effective, and robust manner suitable for conventional applications as well as for aerospace applications. There also is a need in the art for an adsorption process that is capable of regenerably removing $CO_2$ from a flowstream in an efficient, cost-effective, and robust manner suitable for conventional applications as well as for aerospace applications.

SUMMARY OF THE INVENTION

The present invention provides an energy efficient, lightweight sorption system for removal of environmental contaminants in space flight applications. More particularly, the present invention provides an alternative technology for removing both $CO_2$ and trace contaminants within a single unit employing a sorption bed comprising ultra-short-channel-length metal meshes coated with zeolite sorbents. The metal meshes further define a means for direct, resistive electrical-heating thereby providing the potential for short regeneration times, reduced power requirement, and net energy savings in comparison to the conventional system. The present invention eliminates the need for a separate trace contaminant control unit resulting in an opportunity for significant weight and volume savings.

It has now been found that zeolites deposited on ultra-short-channel-length metal mesh elements, known as Microlith® and commercially available from Precision Combustion, Inc., located in North Haven, Conn., effectively adsorb a number of the contaminants of interest. The inert Microlith® ultra-short-channel-length metal mesh substrate and the use of a binder during deposition of the zeolites on the mesh substrate results in volumetric sorbent loadings considerably lower than if the adsorbents were used as a packed bed (e.g., the carbon bed currently employed). However, the ability to directly resistively heat the metal mesh support provides for relatively rapid periodic regenerations. Therefore, the weight and volume of the current TCCS may be substantially reduced (by as much as 75 wt %) by use of zeolites supported on Microlith® ultra-short-channel-length metal mesh elements in conjunction with periodic sorbent regeneration.

Since cabin air is fed directly to the TCCS, humidity may have a significant negative impact on the performance of the zeolite sorbents. Drying agents are used to mitigate the effect of humidity on sorbent effectiveness and precede the current carbon dioxide removal assembly ("CDRA"). In one embodiment of the present invention, a Microlith® ultra-short-channel-length metal mesh based TCCS is combined with the CDRA function. The system incorporates the existing desiccant beds located upstream of the current pellet-based CDRA bed. These driers mitigate the negative impact of humidity on the effectiveness of 5A for $CO_2$ sorption. Locating the Microlith® ultra-short-channel-length metal mesh based TCCS system behind the $CO_2$ removal bed provides a dry stream to the zeolites used for trace contaminant removal.

In another embodiment of the present invention, the packed bed for $CO_2$ removal was replaced with a Microlith® ultra-short-channel-length metal mesh supported 5A zeolite sorbent. As with the TCCS, the Microlith® ultra-short-channel-length metal mesh provided considerably lower volumetric sorbent loadings than the 5A pellet bed (approximately 30%). However, resistive heating of the Microlith® ultra-short-channel-length metal mesh support permits faster periodic regenerations. In yet another embodiment of the present invention, successful integration of both the CDRA and TCCS systems based entirely on Microlith® ultra-short-channel-length metal mesh supported sorbents—and similar in size to the current CDRA unit alone—eliminates the current TCCS unit entirely with corresponding weight and volume savings. Depending upon the design and regeneration requirements, the integrated system offers power savings, as well as additional weight savings, versus the current CDRA pellet bed. The current TCCS and CDRA system is illustrated in FIG. 1A and the integrated Microlith® ultra-short-channel-length metal mesh based CDRA/TCCS system is illustrated in FIG. 1B.

Microlith® ultra-short-channel-length metal mesh technology is a novel reactor engineering design concept comprising of a series of ultra-short-channel-length, low thermal mass metal monoliths that replaces the long channels of a conventional monolith. Microlith® ultra-short-channel-length metal mesh design promotes the packing of more active area into a small volume, providing increased adsorption area for a given pressure drop. The advantages of employing Microlith® ultra-short-channel-length metal mesh as a substrate include the feature of electrically heating the substrate to promote a reaction on a fluid flowing therethrough as described in U.S. Pat. No. 6,328,936 to Roychoudhury, et al., incorporated in its entirety herein. Whereas in a conventional honeycomb monolith, a fully developed boundary layer is present over a considerable length of the device, the ultra short channel length characteristic of the Microlith® substrate avoids boundary layer buildup. Since heat and mass transfer coefficients depend on the boundary layer thickness, avoiding boundary layer buildup enhances transport properties. The advantages of employing Microlith® ultra-short-channel-length metal mesh as a substrate to control and limit the development of a boundary layer of a fluid passing therethrough is described in U.S. patent application Ser. No. 10/832,055 which is a Continuation-In-Part of U.S. Pat. No. 6,746,657 to Castaldi, both incorporated in their entirety herein.

DETAILED DESCRIPTION OF THE INVENTION

Figure 1A:
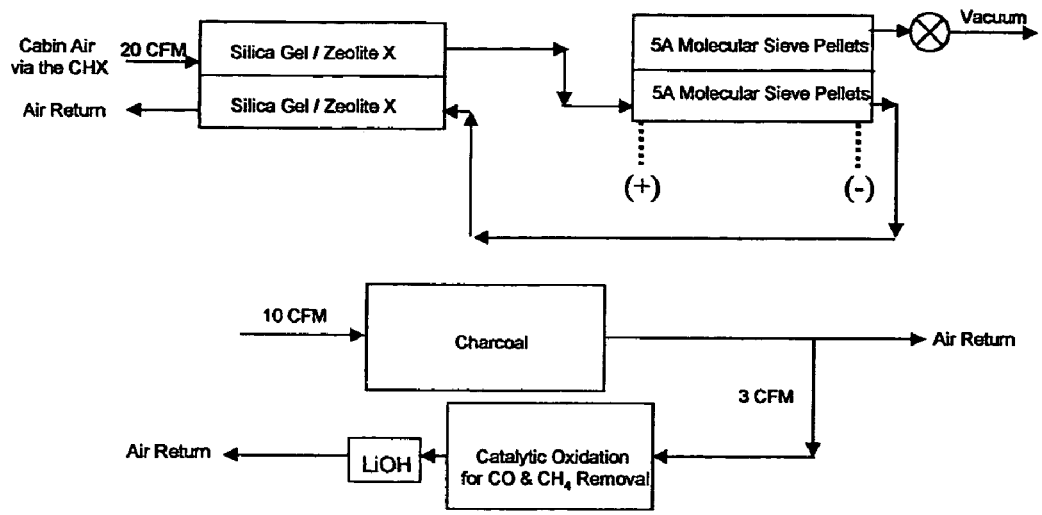
FIG. 1A provides a schematic representation of the current TCCS and CDRA system employed on the ISS.
Figure 1B:
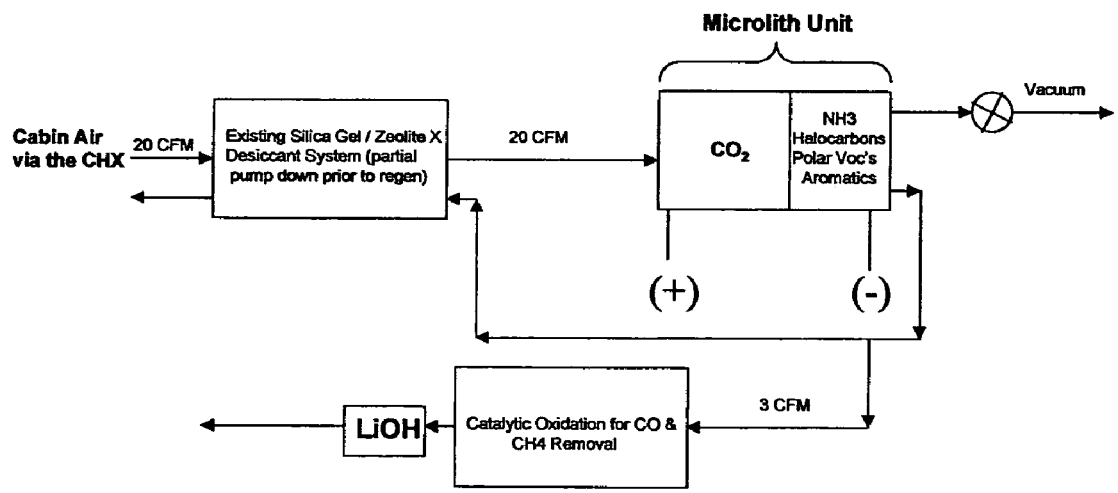
FIG. 1B provides a schematic representation of the integrated Microlith® ultra-short-channel-length metal mesh based CDRA/TCCS system of the present invention.

FIG. 1A provides a diagram of the system currently employed on the ISS. The dehumidification and $CO_2$ adsorption beds operate in swing mode. A separate charcoal bed for adsorption of TCCS also is shown. FIG. 1B provides a diagram of an embodiment of the present invention. The charcoal bed is eliminated and replaced with a regenerable $CO_2$ and TCCS adsorption bed which also may operate in swing mode.

Figure 2:
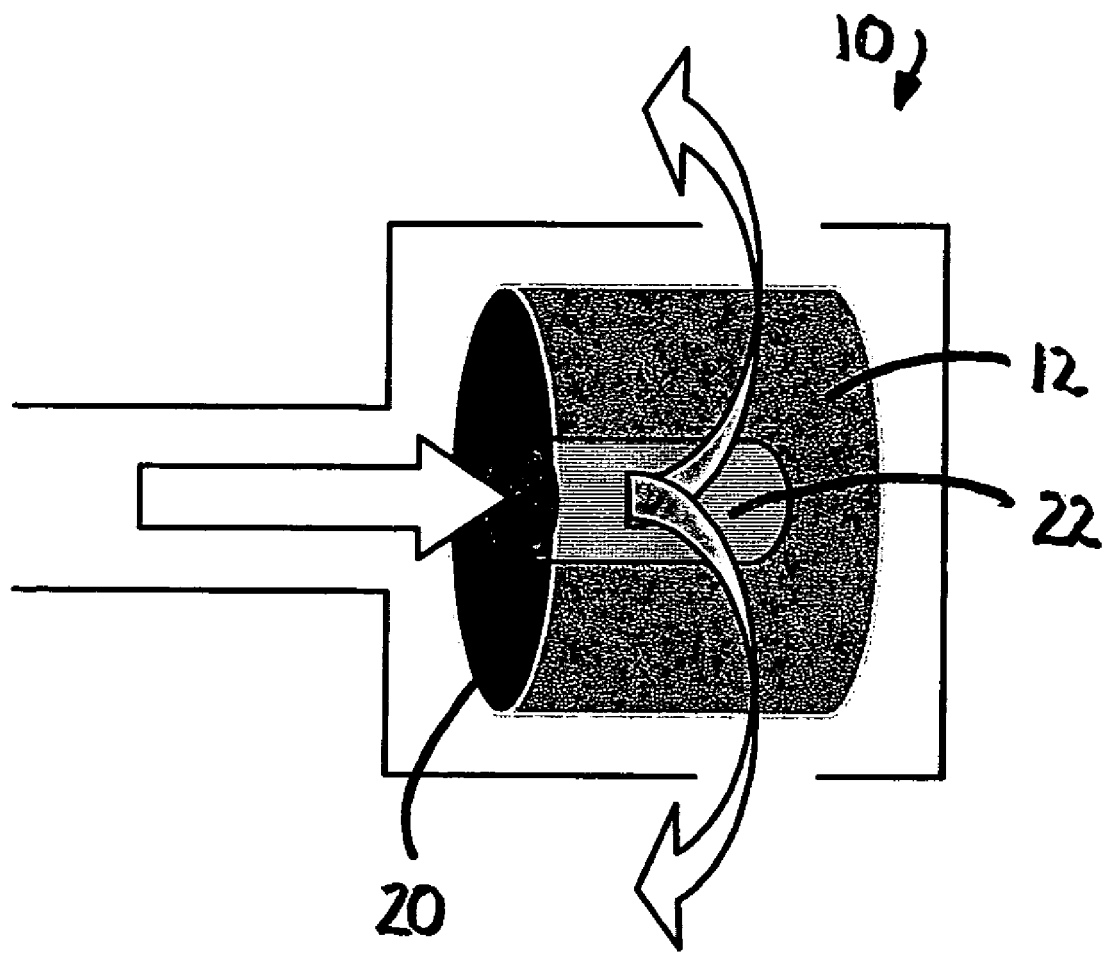
FIG. 2 provides an isometric view of a simplified Microlith® ultra-short-channel-length metal mesh based radial flow sorber configuration of the present invention.

One preferred embodiment of the present invention, as shown in FIG. 2, comprises an axial flow coiled sorber substrate configuration 10, commonly referred to as a "jelly-roll"configuration, defined by a coiled Microlith® ultra-short-channel-length metal mesh 12. Unlike its axial flow counterpart, bypassing of the flowstream around the sorber substrate is not a concern in the radial flow configuration. In addition, the radial flow arrangement provides volumetric sorbent loadings at least comparable to a linear bank of screen elements. Furthermore, from the electrical and hardware assembly vantage points, a continuous length of coated screen largely mitigates the complicating issues encountered with a stack of screens. However, employing a stack of screens as an adsorption bed is considered within the scope of this invention.

Figure 4:
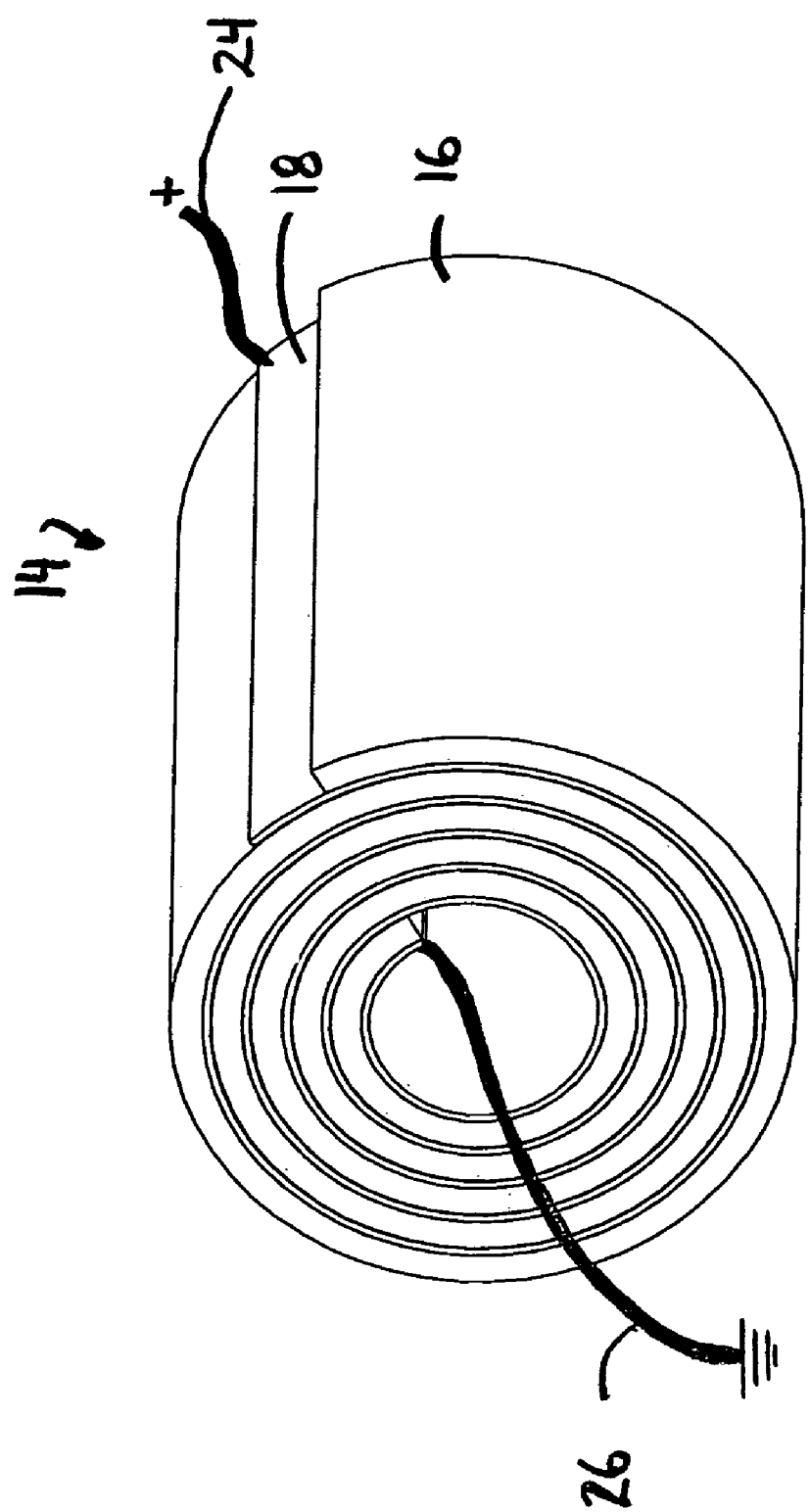
FIG. 4 provides an isometric view of a radial flow reactor configuration of the present invention.

In a preferred embodiment of the radial flow configuration of the present invention, as shown in FIG. 4, the sorbent structure 14 comprises a two layer "sandwich" system consisting of a sorbent-coated glass fiber insulating layer 16 and a sorbent-coated Microlith® ultra-short-channel-length metal mesh layer 18 (total coated thickness of the combined layers is approximately 0.1 cm). For dual function $CO_2$ removal/TCCS, the appropriate lengths of the glass fiber insulating layer and Microlith® ultra-short-channel-length metal mesh layer are coated with the desired amounts of the preferred sorbents 20. The resultant dual layer system is coiled around a centerline feed supply tube 22 as shown in FIG. 2. Direct electrical heating of the Microlith® ultra-short-channel-length metal mesh layer in order to regenerate the sorbent is implemented more readily in this arrangement through electrical leads 24 and 26. However, a radial flow configuration comprising only one layer of a sorbent-coated Microlith® ultra-short-channel-length metal mesh also is considered within the scope of the invention, wherein the coating positioned on the metal mesh serves as the insulating layer between metal mesh layers. Multi-layered radial flow configurations comprising any number of uncoated or sorbent-coated Microlith® ultra-short-channel-length metal mesh layers, with or without any number of uncoated or sorbent-coated glass fiber insulating layers, also are considered within the scope of the invention. The length of the coil or substrate configuration may be selected in order to advantageously employ an available source of electrical current.

Figure 3A:
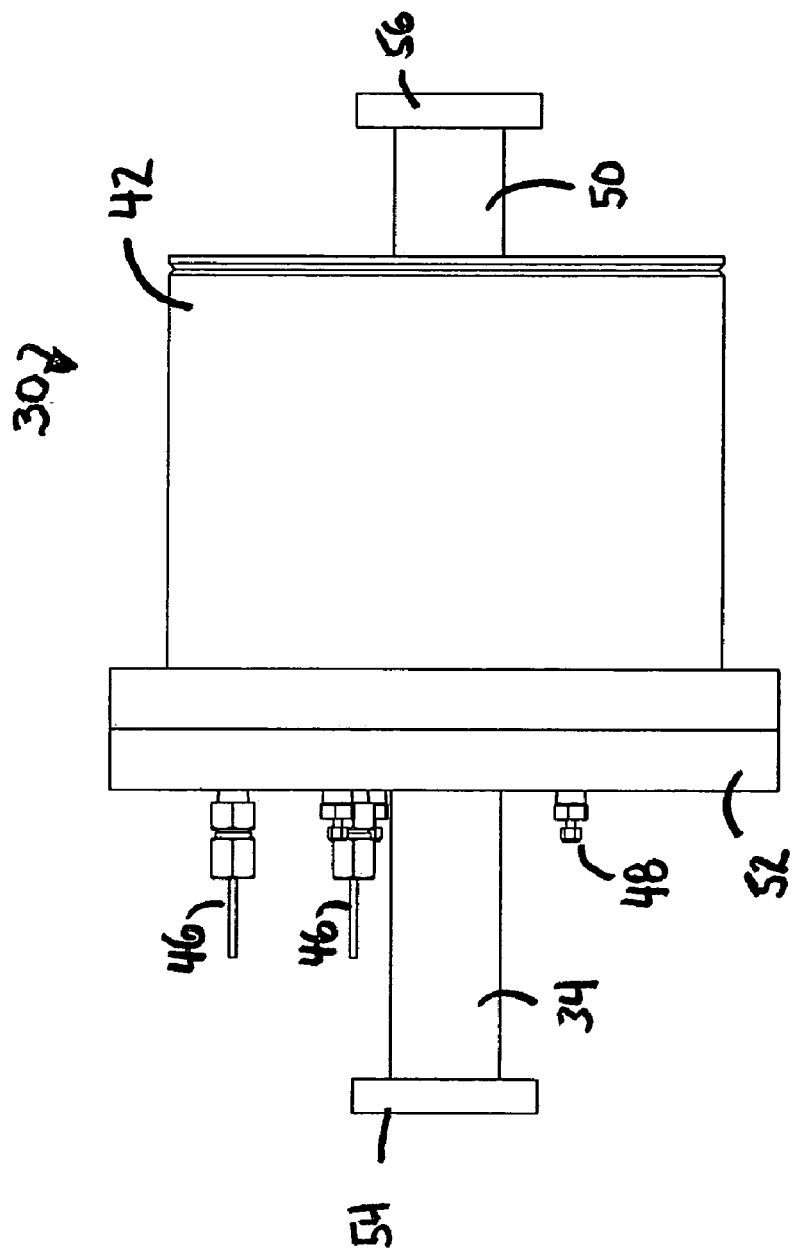
FIG. 3A provides a schematic representation of an external view of a Microlith® ultra-short-channel-length metal mesh based radial flow sorber configuration of the present invention.
Figure 3B:
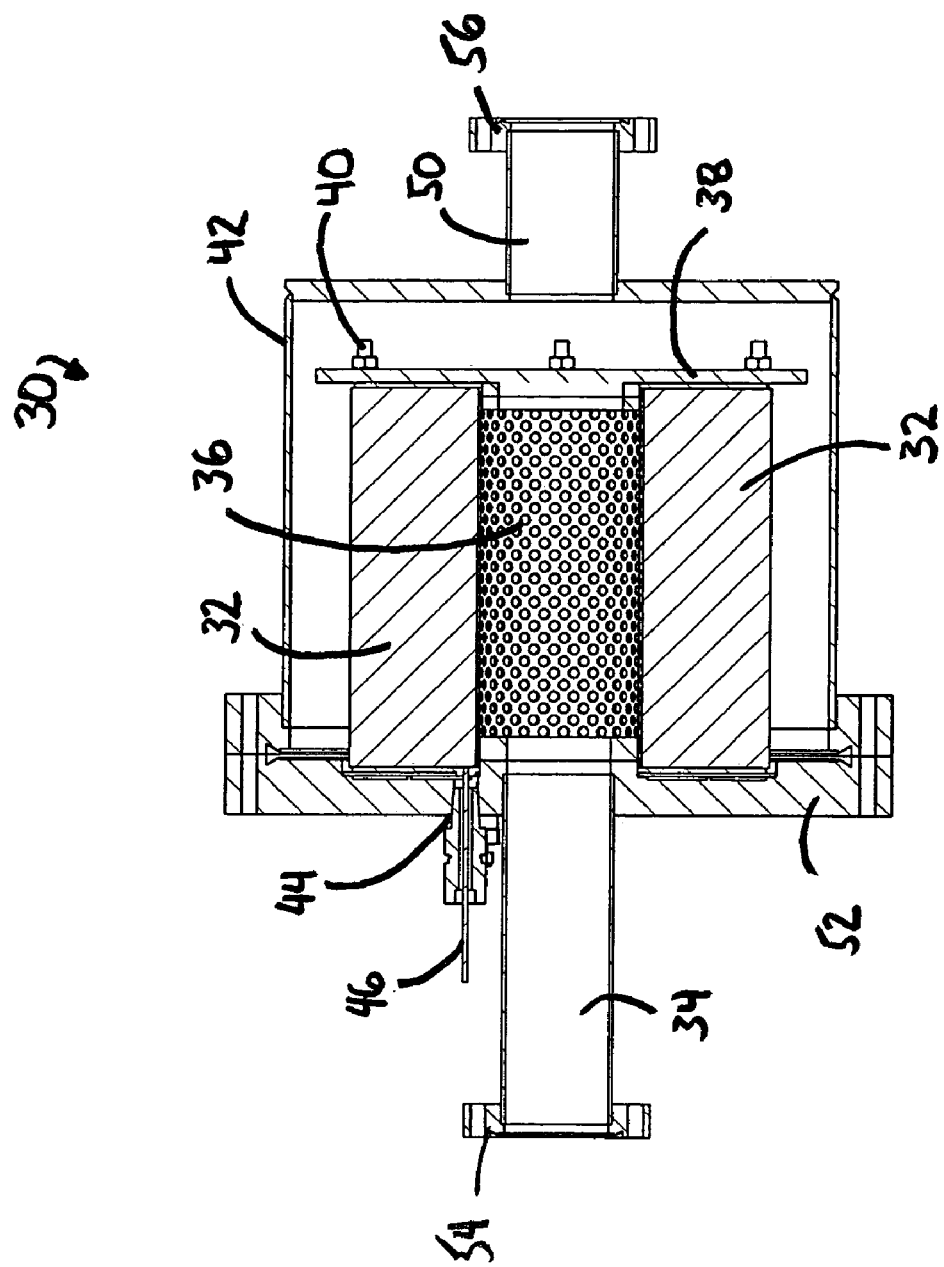
FIG. 3B provides a schematic representation of an internal view of a Microlith® ultra-short-channel-length metal mesh based radial flow sorber configuration of the present invention.

As shown in FIG. 3A and FIG. 3B, one embodiment of an adsorption unit 30 according to the present invention comprises a dual-layer sorber coil 32 that defines a diameter of approximately 7.4 inches and a length of approximately 7.2 inches, the centerline of which is occupied by feed tube 34 defining a diameter of approximately 3 inches. Perforated metal tube 36 is positioned between feed tube 34 and sorber coil 32 for support and flow distribution purposes. Sorber coil 32 is fixed within housing 38 by any conventional means such as threaded fasteners 40, tie rods or the like. Sorber coil 32 and housing 38 are positioned within the adsorption unit casing 42, which casing 42 defines a plurality of apertures 44 in order to provide access for electrical connections 46 or for a variety of testing and measurement components, such as, for example, a port 48 for air quality testing. Adsorption unit 30 further defines exit tube 50, inlet plate 52, and flanges 54 and 56. Adsorption unit casing 42 is joined to inlet plate 52 by any conventional means such as welding, brazing, threaded fasteners, tie rods, or the like. Alternatively, the adsorption unit casing may be fabricated to comprise a front face such that an inlet plate is not required. Flanges 54 and 56 are application dependent and enable installation of adsorption unit 30 into a system assembly.

This embodiment of the present invention is targeted to operate at approximately the same nominal contact time as the current CDRA sorber (approximately 1.8 seconds). This corresponds to a volumetric flow rate of approximately 5 cfm through the annular sorber coil volume of 258.5 in$^3$ (4235 cc). Average sorbent loading (based on 5A, Y, and ZSM-5) on the coated coil was 70 mg/in$^2$ of washcoat (70% zeolite and 30% binder) on each layer (i.e., Microlith® ultra-short-channel-length metal mesh layers and woven glass fiber mesh layers).

The sorber coil 32 plus the 3-inch centerline feed tube 34 occupied approximately 5075 cc, or approximately 30% of the sorbent volume in one of the canisters employed in the current CDRA. The coated sorber coil 32 itself occupied approximately 26% of the current CDRA sorbent volume. Deducting the feed tube volume of approximately 840 cc resulted in a net volume for the total sorber coil ($CO_2$ & trace contaminant removal) of approximately 4235 cc. Devoting 82.5% of this net sorber volume to $CO_2$ sorption corresponded to 213.2 in$^3$ (3494 cc) of sorber volume containing 5284 in$^2$ at 140 mg 5A sieve/in (70 mg 5A sieve/in/double layer) or 740 gm of 5A washcoat.

The $CO_2$ sorber regeneration requirement sets the cycle time for the TCCS sorption section of the coil, which occupied 17.5% of the total annular sorption volume, or 45.1 in$^3$ (740 cc). The TCCS coating followed the 5A coating and therefore was located at the end of the screen, i.e. at the outer portion of the wound coil. The initial 57.5% of this TCCS segment was washcoated with zeolite Y and the balance with ZSM-5. A length/loading calculation similar to that described for 5A sieve above indicated that the TCCS segment contained approximately 90 grams of Y and approximately 67 grams of ZSM-5. Assuming no contribution to trace contaminant removal from the 5A molecular sieve, this allocation of 15–20% of the sorber volume to a post-5A TCCS function (Y/ZSM-5 approximately 1.35) is sufficient to maintain the exit concentration of the trace contaminants below their inlet levels during the sorption cycle.

Power requirements were examined for direct electrical heating of the coil based on estimates of the total energy required to heat the mass of sorber components and to supply the heat of desorption (dominantly that of $CO_2$, but also that of the trace components). Radiation losses are ignored since these are likely to be small at the target regeneration temperatures for a well-insulated system having a low ratio of external surface area to total sorber volume. Assuming no other losses, the total required energy during heat up to the regeneration temperature is the sum of $mC_p\Delta T$ for the washcoat, substrate, and insulating layer plus the heats of desorption (where m=mass; $C_p$=specific heat capacity; and $\Delta T$=temperature difference). The Microlith® ultra-short-channel-length metal mesh sorber coil has a lower bulk density in comparison to a pellet bed of 5A (approximately 65% of the weight of an equivalent pellet volume), and a lower overall estimated specific heat. Assuming a 45 minute sorption/regeneration cycle, approximately 110–150 watts is required per module depending upon the final target regeneration temperature (230–300° C.).

The use of the inert Microlith® ultra-short-channel-length metal mesh substrate to support the zeolite sorbents resulted in a reduced volumetric sorption capacity in comparison to a conventional pellet bed. A preferred embodiment of the present invention employed sorbent comprising 5A zeolite (the calcium form of A) for $CO_2$ removal, and high Al content zeolite Y (CBV-400), and moderate Al content ZSM-5 (CBV-5524) for trace contaminant removal. The zeolite loadings on the Microlith® ultra-short-channel-length metal mesh substrate should be greater than approximately 20 mg/in$^2$, preferably greater than approximately 70 mg/in$^2$, and more preferably in the range of approximately 70–100 mg/in$^2$.

Bench-scale testing of a stack arrangement for all five of the representative trace components (acetone, dichloromethane, toluene, ethanol, and ammonia) was conducted in order to evaluate the performance of candidate sorbents. The testing ensured that all of the delivered trace contaminant reached the sorbent inlet and could be properly accounted for, despite the particularly challenging ammonia component. An $NH_3/N_2$ stream was introduced and mixed with the stream containing the other trace contaminants and/or $CO_2$. Ammonia injection and mixing was located just upstream of the sorber section. A mixer was employed to permit uniform flow and mixing across the cross sectional area of the flow path. Analysis of $NH_3$ in the effluent was conducted via chemiluminescence after catalytically converting it to $NO_x$. The adequacy of system performance was determined in repeated tests employing sampling before and after the empty sorber section, and bypassing the entire system.

Multi-cycle durability testing with both $CO_2$ and the five trace components also were conducted in order to examine the robustness of the Microlith® ultra-short-channel-length metal mesh supported sorbents. A thermocouple was located in the sorber housing in order to ascertain the mid-bed centerline temperature. To reduce heat losses during regeneration, the sorber housing was removed and subjected to vacuum and external heating within a programmable oven. Bed regeneration temperatures of approximately 230° C. were maintained for approximately 90 minutes after the thermocouple in the center of the bed registered the target value. Thereafter, the oven cooled to room temperature over several hours. Vacuum was maintained on the sorbent housing during the oven cool-down period. Prior to the first sorption cycle, the freshly charged unit was subjected to the modified vacuum regeneration procedure. Regeneration was also conducted after each subsequent sorption cycle.

Figure 5:
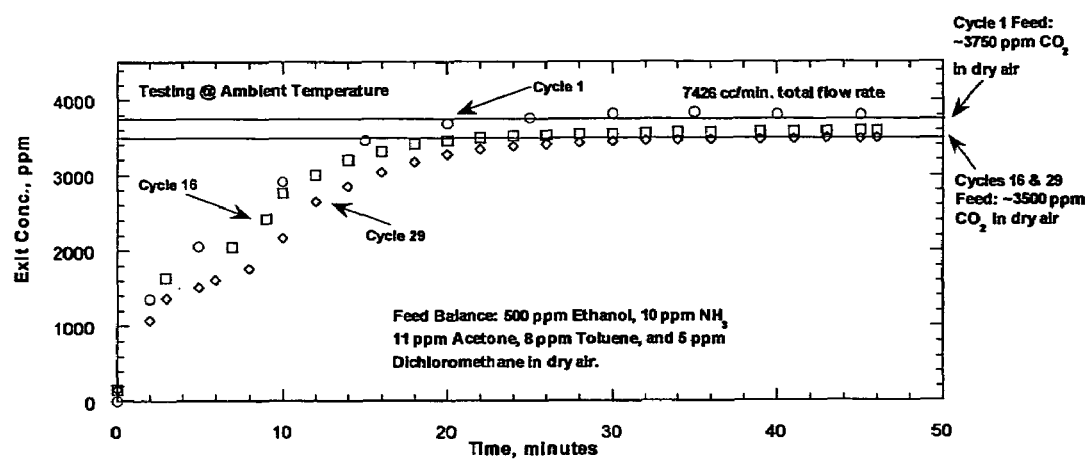
FIG. 5 provides a graphical depiction of durability data of an adsorption system according to the present invention.

The reactor design comprising alternate layers of coated Microlith® ultra-short-channel-length metal mesh layers and woven glass fiber mesh, with approximately 80% of the available volume devoted to supporting 5A sorbent for $CO_2$ removal and approximately 20% devoted to supporting Y and ZSM-5 for trace contaminant removal, was tested for 30 sorption/regeneration cycles over 520 hours to demonstrate durability. The end of a sorption cycle was defined as the point at which any of the delivered feed components closely approached (approximately 98%) its feed concentration. The feed concentrations were approximately ½ SMAC (Spacecraft Maximum Allowable Concentration) for all components with the exception of $NH_3$ which was delivered at 75%–100% SMAC to facilitate analysis. Results of the 30 cycle durability testing are summarized in Table 1 and graphically represented in FIG. 5.

sorption observed in cycle 1 (1.3× greater $CO_2$ sorption). This may result from the creation of a cleaner, drier sorbent surface in comparison to that of the fresh sorbent that was subjected to a single milder pretreatment at the 230° C. temperature.

Returning to the 230° C. regeneration temperature for the next 5 cycles (cycles 18 through 22), again resulted in declining cycle-to-cycle performance. Again, back-to-back regenerations at higher temperatures in cycles 23 and 24 (275° C. and 300° C., respectively) resulted in $CO_2$ sorption 1.25× greater than cycle 1. Finally, performance decline over the next 4 cycles (with regeneration at 230° C.) were once again overcome by back-to-back regenerations at the higher temperatures in cycles 29 and 30 (1.2× and 1.5×greater $CO_2$ sorption, respectively). These results indicate that the system is robust and suggest that an acceptable operating regimen may employ lower temperature regeneration (i.e. lower power requirement) over several sorption cycles in conjunction with periodic higher temperature regenerations to fully restore bed sorption capacity. Over the 30 cycles, the trace contaminants remained at <25% of their inlet concentrations at end-of-cycle. The exit concentrations increased as the number of cycles increased and showed some variation with regeneration temperature. Overall, however, the data suggested the attainment of an "equilibration" value with increasing number of cycles, which—over the regeneration temperature range employed—was relatively invariant (Runs 20, 23, 27, 29, and 30).

Figure 6:
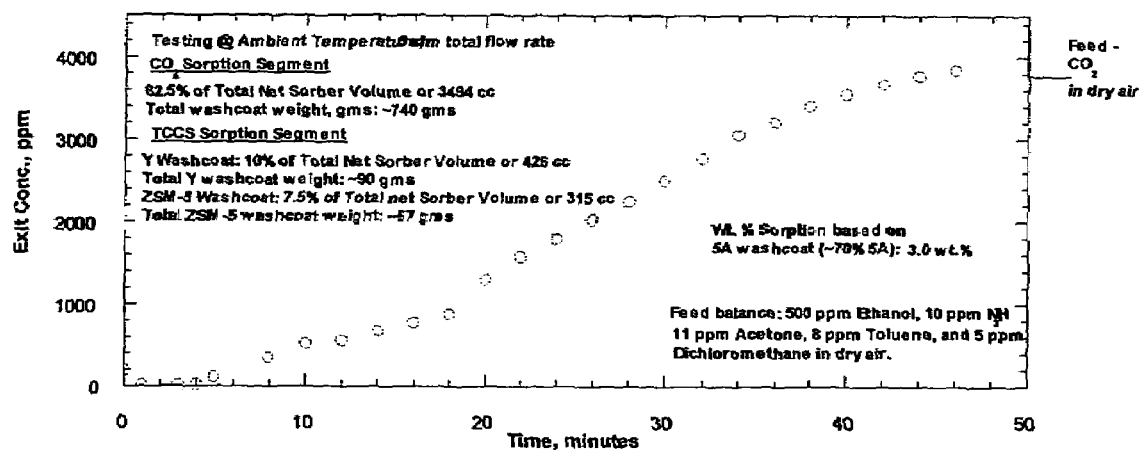
FIG. 6 provides a graphical depiction of test data comprising cycle-to-cycle variations in $CO_2$ sorption of an adsorption system according to the present invention.

FIG. 6 provides a graphical representation of $CO_2$ sorption data obtained from a prototype system that was tested with $CO_2$ and trace contaminants. The data indicates 3 wt % $CO_2$ co-adsorption capacity and a 45–50 minute cycle during which approximately 55% of the delivered $CO_2$ was

TABLE 1

| Cycle # | | Vacuum Regeneration Temp. Prior to Cycle, ° C. | Relative CO2 Sorp. Perfoumance | ppm Trace Component @ CO2 End of Cycle | | | | |
|---|---|---|---|---|---|---|---|---|
| | | | | Ethanol | Acetone | DCM | Toluene | NH₃ |
| 1 | | 230 | 1.00 | 3 | 0 | 0 | 0 | 0 |
| 5 | cycles 1 | ↓ | 0.72 | 4 | 0 | 0 | 0 | 0 |
| 10 | through | | 0.57 | 5 | 0 | 0 | 0 | 0 |
| 15 | 15 @ 230 ° C. | | 0.58 | 24 | 0.2 | 0 | 0 | 0 |
| 16 | | 275 | 1.02 | 47 | 0.9 | 0 | <0.1 | 0 |
| 17 | | ↓ | 1.37 | 52 | 1 | 0 | <0.1 | 0 |
| 20 | cycles 18 through | 230 ↓ | 0.83 | 74 | 1.2 | 0.9 | 0.1 | 0 |
| 22 | 22 @ 230 ° C. | | 0.35 | 65 | 0.8 | 0.9 | 0.1 | 0 |
| 23 | | 275 | 0.70 | 88 | 1.6 | 1 | 0.2 | 0 |
| 24 | | 300 | 1.25 | 48 | 0.8 | 0.2 | <0.1 | 0 |
| 25 | cycles 25 | 230 | 1.15 | 63 | 1 | 1.1 | 0.1 | 0 |
| 27 | through | ↓ | 0.50 | 80 | 1.3 | 1.1 | 0.1 | 0 |
| 28 | 28 @ 230° C. | 230 | — | — | — | — | — | — |
| 29 | | 275 | 1.22 | 82 | 1.4 | 1.1 | 0.1 | 0 |

The results demonstrate that $CO_2$ breakthrough defined the end of cycle, i.e. trace contaminants were below their inlet concentration at the point where $CO_2$ exit concentration approached the inlet concentration. The data in Table 1 illustrates that vacuum regeneration at 230° C. over the first 15 cycles resulted in decreasing $CO_2$ sorption. Regeneration at mid-bed temperatures above 230° C., however, was able to restore the lost $CO_2$ sorption capacity, as illustrated by the performance in cycle 16 after a 275° C. regeneration. Back-to-back cycles regenerated at 275° C. exceeded the adsorbed. During this test, all trace contaminant levels remained less than or equal to their respective inlet concentrations.

While the present invention has been described in considerable detail, other configurations exhibiting the characteristics taught herein for an improved method for adsorption employing electrically heated ultra-short-channel-length metal mesh elements are contemplated. Therefore, the spirit and scope of the invention should not be limited to the description of the preferred embodiments described herein.

What is claimed is:

1. A method for regenerable adsorption comprising:
   a) providing a substrate defining at least one layer of ultra short channel length mesh capable of conducting an electrical current therethrough;
   b) coating at least a portion of the substrate with sorbent;
   c) resistively heating the substrate; and
   d) passing a flowstream through the substrate and in contact with the sorbent.

2. The method of claim 1 wherein the substrate further comprises a second insulating layer of ultra short channel length mesh.

3. The method of claim 1 wherein the substrate defines a coil such that the flowstream passes radially through the coil.

4. The method of claim 2 wherein the dual-layer substrate defines a coil such that the flowstream passes radially through the coil.

5. The method of claim 1 wherein the coating comprises zeolite.

6. The method of claim 2 wherein the coating comprises zeolite.

7. The method of claim 3 wherein the coating comprises zeolite.

8. The method of claim 4 wherein the coating comprises zeolite.

9. A method for regenerable adsorption comprising:
   a) providing a substrate defining at least one layer of ultra short channel length mesh;
   b) coating at least a portion of the substrate with sorbent;
   c) providing a means for resistively heating the substrate; and
   d) providing a means for passing a flowstream through the substrate and in contact with the sorbent.

10. The method of claim 9 wherein the substrate further comprises a second insulating layer of ultra short channel length mesh.

11. The method of claim 9 wherein the substrate defines a coil such that the flowstream passes radially through the coil.

12. The method of claim 10 wherein the dual-layer substrate defines a coil such that the flowstream passes radially through the coil.

13. The method of claim 9 wherein the coating comprises zeolite.

14. The method of claim 10 wherein the coating comprises zeolite.

15. The method of claim 11 wherein the coating comprises zeolite.

16. The method of claim 12 wherein the coating comprises zeolite.

17. The method of claim 1 wherein the substrate defines a linear stack of a plurality of layers of ultra short channel length mesh capable of conducting an electrical current therethrough.

18. The method of claim 17 wherein the linear stack further comprises a second insulating layer of ultra short channel length mesh.

19. The method of claim 18 wherein the coating comprises zeolite.

* * * * *